US011586282B2

(12) United States Patent
Hou et al.

(10) Patent No.: US 11,586,282 B2
(45) Date of Patent: Feb. 21, 2023

(54) METHOD, DEVICE, AND COMPUTER PROGRAM PRODUCT FOR MONITORING USER

(71) Applicant: EMC IP Holding Company LLC, Hopkinton, MA (US)

(72) Inventors: Anzhou Hou, Shanghai (CN); Danqing Sha, Shanghai (CN); Zhen Jia, Shanghai (CN); Bin He, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 139 days.

(21) Appl. No.: 17/163,654

(22) Filed: Feb. 1, 2021

(65) Prior Publication Data

US 2022/0206568 A1 Jun. 30, 2022

(30) Foreign Application Priority Data

Dec. 31, 2020 (CN) .......................... 202011633324.0

(51) Int. Cl.
*G06F 3/01* (2006.01)
*G02B 27/01* (2006.01)
*G06F 21/32* (2013.01)
*G06V 20/30* (2022.01)
(Continued)

(52) U.S. Cl.
CPC ........... *G06F 3/013* (2013.01); *G02B 27/017* (2013.01); *G06F 21/32* (2013.01); *G06V 20/30* (2022.01); *G06V 40/19* (2022.01); *G06V 40/197* (2022.01)

(58) Field of Classification Search
CPC ....... G06F 3/013; G06F 21/32; G02B 27/017; G02B 2027/014; G06V 20/30; G06V 40/19; G06V 40/197; G06K 9/00496; H04N 7/181
See application file for complete search history.

(56) References Cited

U.S. PATENT DOCUMENTS

| 2011/0221669 A1* | 9/2011 | Shams .................. G02C 11/10 |
| | | 345/156 |
| 2013/0069787 A1* | 3/2013 | Petrou ..................... G06F 3/012 |
| | | 340/573.1 |
| 2016/0342782 A1* | 11/2016 | Mullins .............. G02B 27/0176 |

OTHER PUBLICATIONS

Dell Inc. "Dell Visor with Controllers VRP100, Dell Visor VR118, Dell Visor Controllers VRC100," User's Guide, Nov. 2017, 28 pages.
Virtual Reality and Augmented Reality Wiki, "Dell Visor," https://xinreality.com/wiki/Dell_Visor, Nov. 1, 2017, 4 pages.
Dell Inc. "Dell Virtual Reality," https://www.dell.com/learn/us/en/04/campaigns/dell-virtual-reality, accessed Jan. 28, 2021, 5 pages.
(Continued)

*Primary Examiner* — Abhishek Sarma
(74) *Attorney, Agent, or Firm* — Ryan, Mason & Lewis, LLP (57) ABSTRACT

Illustrative embodiments of the present disclosure relate to a method, a wearable device, an electronic device, and a computer program product for monitoring a user. The method includes verifying an identity of the user by analyzing user data related to the user and obtained by a wearable device, the user data including at least a first image of a part of the user's body. The method further includes monitoring a relative position of the wearable device with respect to the user based on sensor data obtained by the wearable device if the verification on the identity of the user succeeds; monitoring a surrounding environment of the user based on a second image of the surrounding environment obtained by the wearable device; and monitoring behaviors of the user based at least in part on the monitored relative position and the monitored surrounding environment.

20 Claims, 7 Drawing Sheets

(51) Int. Cl.
*G06V 40/19* (2022.01)
*G06V 40/18* (2022.01)

(56) References Cited

OTHER PUBLICATIONS

Logmein, "Our Products," httpswww.logmeininc.comproducts, accessed Jan. 28, 2021, 5 pages.
Examity, "Online Proctoring, on Your Terms," https://www.examity.com/, accessed Jan. 28, 2021, 6 pages.
Wikipedia, "LogMeIn," https://en.wikipedia.org/wiki/LogMeIn, Jan. 24, 2021, 5 pages.
Wikipedia, "Mettl," https://en.wikipedia.org/wiki/Mettl, Jul. 14, 2020, 2 pages.
Proctoru Inc. "We Help You Protect Any Onlne Exam," https://www.proctoru.com/services, accessed Jan. 28, 2021, 6 pages.
Verificient Technologies, "Proctortrack," https://www.verificient.com/proctortrack/, accessed Jan. 28, 2021, 7 pages.
University of Central Florida, "ProctorHub," https://proctorhub.cdl.ucf.edu/proctorhub/, accessed Jan. 28, 2021, 2 pages.

\* cited by examiner

METHOD, DEVICE, AND COMPUTER PROGRAM PRODUCT FOR MONITORING USER

RELATED APPLICATION(S)

The present application claims priority to Chinese Patent Application No. 202011633324.0, filed Dec. 31, 2020, and entitled "Method, Device, and Computer Program Product for Monitoring User," which is incorporated by reference herein in its entirety.

FIELD

Embodiments of the present disclosure generally relate to the field of user monitoring, and more particularly, to a method, a device, and a computer program product for monitoring a user.

BACKGROUND

With the rapid development of information technologies, remote applications such as remote office, remote education, and remote examination are more and more widely used in various fields. These remote applications have changed users' original behavior patterns to a large extent and provide convenience for users. For example, remote examinations do not require the use of an examination room, and users taking the examinations do not need to run back and forth between their residences and the examination room, which saves paper and can further save costs and time.

For these users who adopt a remote application, how to monitor the users' behaviors has attracted widespread attention. For example, the users who take the remote examination cannot be monitored on site. In a conventional monitoring method, the users' behaviors can be monitored in real time by an invigilator through cameras. However, this conventional monitoring method cannot detect certain cheating behaviors of the users, and the user experience is not good.

SUMMARY

Embodiments of the present disclosure provide a method, a wearable device, an electronic device, and a computer program product for monitoring a user.

In a first aspect of the present disclosure, a method for monitoring a user is provided. The method includes verifying an identity of the user by analyzing user data related to the user and obtained by a wearable device, the user data including at least a first image of a part of the user's body. The method further includes monitoring a relative position of the wearable device with respect to the user based on sensor data obtained by the wearable device if the verification on the identity of the user succeeds; monitoring a surrounding environment of the user based on a second image of the surrounding environment obtained by the wearable device; and monitoring behaviors of the user based at least in part on the monitored relative position and the monitored surrounding environment.

In a second aspect of the present disclosure, a wearable device is provided. The wearable device includes a processing unit. The processing unit is configured to verify an identity of a user by analyzing user data related to the user and obtained by the wearable device, the user data including at least a first image of a part of the user's body. The processing unit is further configured to monitor a relative position of the wearable device with respect to the user based on sensor data obtained by the wearable device if the verification on the identity of the user succeeds; monitor a surrounding environment of the user based on a second image of the surrounding environment obtained by the wearable device; and monitor behaviors of the user based at least in part on the monitored relative position and the monitored surrounding environment.

In a third aspect of the present disclosure, an electronic device is provided. The electronic device includes at least one processing unit and at least one memory. The at least one memory is coupled to the at least one processing unit and stores instructions for execution by the at least one processing unit. The instructions, when executed by the at least one processing unit, cause the electronic device to perform actions. The actions include verifying an identity of a user by analyzing user data related to the user and obtained by a wearable device, the user data including at least a first image of a part of the user's body. The actions further include monitoring a relative position of the wearable device with respect to the user based on sensor data obtained by the wearable device if the verification on the identity of the user succeeds; monitoring a surrounding environment of the user based on a second image of the surrounding environment obtained by the wearable device; and monitoring behaviors of the user based at least in part on the monitored relative position and the monitored surrounding environment.

In a fourth aspect of the present disclosure, a computer program product is provided. The computer program product is tangibly stored in a non-transitory computer storage medium and includes machine-executable instructions. The machine-executable instructions, when executed by a device, cause this device to implement any step of the method described according to the first aspect of the present disclosure.

This Summary is provided to introduce the selection of concepts in a simplified form, which will be further described in the Detailed Description below. The Summary is neither intended to identify key features or essential features of the present disclosure, nor intended to limit the scope of the present disclosure.

BRIEF DESCRIPTION OF THE DRAWINGS

The above and other objectives, features, and advantages of the present disclosure will become more apparent from the following description of example embodiments of the present disclosure, with reference to the accompanying drawings, and in the example embodiments of the present disclosure, the same reference numerals generally represent the same components.

In the accompanying drawings, identical or corresponding reference numerals represent identical or corresponding parts.

DETAILED DESCRIPTION

Illustrative embodiments of the present disclosure will be described in more detail below with reference to the accompanying drawings. Although illustrative embodiments of the present disclosure are shown in the accompanying drawings, it should be understood that the present disclosure can be implemented in various forms and should not be limited by the embodiments set forth herein. Instead, the embodiments are provided to make the present disclosure more thorough and complete and to fully convey the scope of the present disclosure to those skilled in the art.

The term "include" and variants thereof as used herein indicate open-ended inclusion, i.e., "including but not limited to." Unless specifically stated, the term "or" means "and/or." The term "based on" means "based at least in part on." The terms "an example embodiment" and "an embodiment" indicate "at least one example embodiment." The term "another embodiment" indicates "at least one additional embodiment." The terms "first," "second," and the like may refer to different or identical objects. Other explicit and implicit definitions may also be included below.

As briefly mentioned above, remote applications have changed users' original behavior patterns to a large extent and provide convenience for users. However, how to monitor behaviors of users using a remote application is a challenge. For example, users who take a remote examination cannot be monitored on site. In a conventional solution, the users' behaviors can be monitored in real time by an invigilator through cameras.

The above conventional solution has encountered some problems in actual use. For example, in actual use, cameras built in the users' notebooks are usually used to monitor the users' behaviors. Because the image capture ranges of the built-in cameras of the notebooks are limited, certain cheating behaviors of the users cannot be detected.

In addition, to better monitor the users' behaviors, a large number of monitoring personnel are required to monitor the users. For example, in remote examinations, in order to avoid user cheating, it is better for monitoring personnel to perform one-to-one monitoring on users taking the remote examinations. In this way, a very large number of monitoring personnel will be required. However, usually due to the lack of invigilators, one invigilator needs to monitor multiple users at the same time. In this way, the invigilator often fails to discover certain cheating behaviors of the users. In addition, since the users will feel as if they are being watched, the user experience is not good.

A solution for monitoring a user is provided according to the embodiments of the present disclosure to solve one or more of the above problems and other potential problems. In the solution, an identity of the user is verified by analyzing user data related to the user and obtained by a wearable device. If the verification on the identity of the user succeeds, the solution can also monitor a relative position of the wearable device with respect to the user based on sensor data obtained by the wearable device, and monitor a surrounding environment of the user based on an image of the surrounding environment obtained by the wearable device. In the solution, behaviors of the user are monitored through the monitored relative position of the wearable device with respect to the user and the monitored user's surrounding environment. Through this solution, the identity of the user can be verified, and the behaviors of the user can be monitored without manpower.

Figure 1:
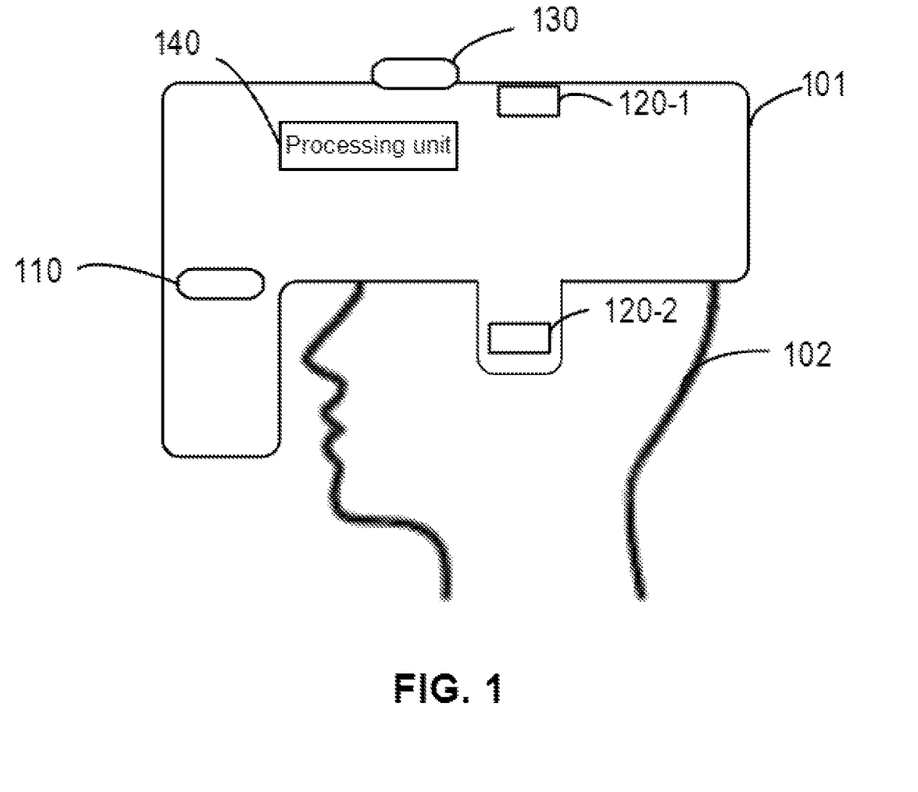
FIG. 1 shows a schematic diagram of an example wearable device according to an embodiment of the present disclosure.

The embodiments of the present disclosure will be described in detail below with reference to the accompanying drawings. FIG. 1 shows a schematic diagram of example wearable device 101 according to an embodiment of the present disclosure. As shown in FIG. 1, wearable device 101 may be worn on the head of user 102. It should be understood that example wearable device 101 in FIG. 1 is only exemplary and not restrictive. Wearable device 101 may also be other forms of devices that are worn on other body parts of user 102. The number and arrangement of entities, elements, and modules shown in FIG. 1 are merely illustrative, and wearable device 101 may include different numbers and different arrangements of entities, elements, and modules.

As shown in FIG. 1, wearable device 101 includes processing unit 140. Processing unit 140 is configured to verify an identity of user 102 by analyzing user data related to user 102 and obtained by wearable device 101. The user data includes at least an image of a part of the body of user 102. In some embodiments, wearable device 101 may include first camera 110 configured to capture an image of an iris of user 102 as a first image. In other embodiments, first camera 110 may be arranged outside wearable device 101 and separated from wearable device 101, and first camera 110 may communicate with wearable device 101. For example, first camera 110 is configured to capture an image of the face of user 102 as a first image, and transmit the first image to wearable device 101.

Additionally, in some embodiments, the user data may also include other data related to user 102, such as identity data, sound data, and the like of the user. In this way, processing unit 140 can verify the identity of user 102 to prevent other persons from personating the identity of user 102.

Processing unit 140 is configured to monitor a relative position of wearable device 101 with respect to user 102 based on sensor data obtained by wearable device 101 if the verification on the identity of user 102 succeeds. In some embodiments, wearable device 101 may include a set of pressure sensors 120, and the set of pressure sensors 120 is configured to collect the sensor data. When wearable device 101 is worn by user 102, set of sensors 120 is distributed on the top side (pressure sensor 120-1 shown in FIG. 1), the left side (pressure sensor 120-2 shown in FIG. 1), and the right side (not shown) of the head of user 102. The distribution of set of pressure sensors 120 shown in FIG. 1 is only schematic, and set of pressure sensors 120 may have other distributions. In some other embodiments, other sensors may be used to collect the sensor data to monitor the relative position of wearable device 101 with respect to user 102.

Processing unit 140 is further configured to monitor a surrounding environment of user 102 based on a second image of the surrounding environment obtained by wearable device 101 if the verification on the identity of user 102 succeeds. In some embodiments, wearable device 101 may include second camera 130 configured to capture the second image of the surrounding environment of user 102, for example, in a 360-degree range. In some other embodiments, second camera 130 may be arranged outside wearable device 101 and separated from wearable device 101, for example, on a ceiling of a room. Second camera 130 can communicate with wearable device 101 to transmit the captured second image to wearable device 101.

Processing unit 140 is further configured to monitor behaviors of user 102 based at least in part on the monitored relative position of wearable device 101 with respect to user 102 and the monitored surrounding environment of user 102. In this way, processing unit 140 can monitor the behaviors of user 102 to prevent user 102 from performing unauthorized behaviors.

Figure 2:
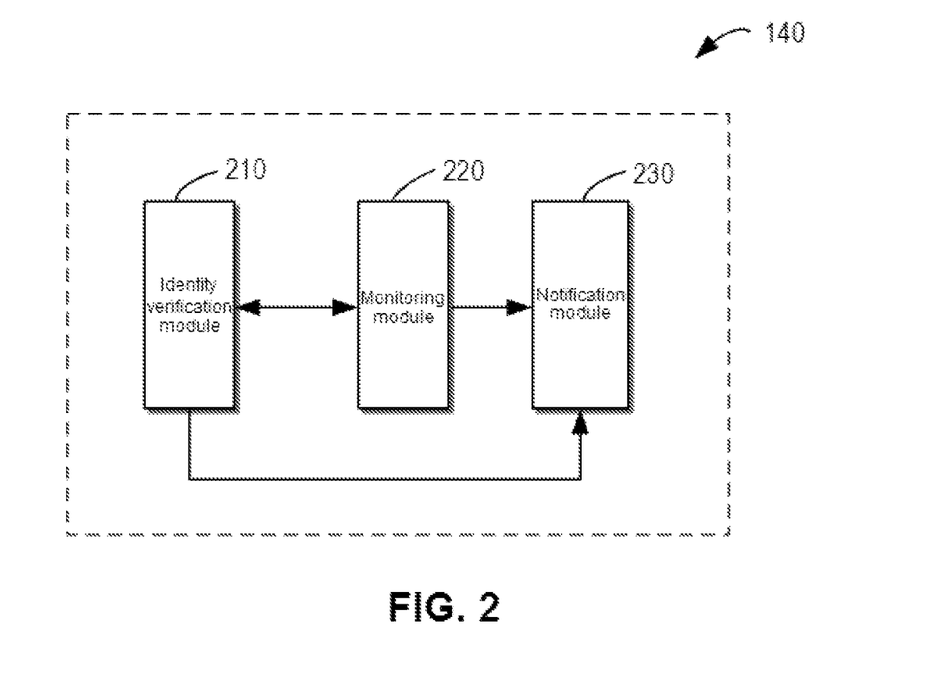
FIG. 2 shows a schematic structural block diagram of a processing unit of an example wearable device according to some embodiments of the present disclosure.

The modules of processing unit 140 will be described in detail below. FIG. 2 shows a schematic structural block diagram of processing unit 140 of example wearable device 101 according to some embodiments of the present disclosure. As shown in FIG. 2, processing unit 140 includes identity verification module 210, monitoring module 220, and notification module 230. It should be understood that although processing unit 140 is divided into multiple separate modules in FIG. 2, this is only illustrative, and processing unit 140 may be a single module that performs multiple functions, or may be divided into other modules in other ways. It should be understood that although processing unit 140 is shown as a part of wearable device 101 in FIG. 1, processing unit 140 may not be included in wearable device 101 and may be other appropriate devices or apparatuses.

As shown in FIG. 2, identity verification module 210 verifies the identity of user 102. In some embodiments, identity verification module 210 receives a first image captured by first camera 110, such as a first image of an iris of user 102. Identity verification module 210 compares the received first image with predetermined iris information to verify the identity of user 102. Alternatively, in some embodiments, identity verification module 210 may also use other methods to verify the identity of user 102. The identity verification process of identity verification module 210 will be described in more detail below in conjunction with FIG. 5. If identity verification module 210 determines that the verification on the identity of user 102 succeeds, identity verification module 210 may transmit the result of successful verification to monitoring module 220. If identity verification module 210 determines that the verification on the identity of user 102 fails, identity verification module 210 may transmit the result of failed verification to notification module 230.

Monitoring module 220 starts to monitor user 102 after receiving the result of successful verification on the identity of user 102. In some embodiments, monitoring module 220 receives the sensor data collected by set of pressure sensors 120 to monitor the relative position of wearable device 101 with respect to user 102. Monitoring module 220 also receives the second image captured by second camera 130 to monitor the surrounding environment of user 102. Monitoring module 220 monitors the behaviors of user 102 based on the monitoring of the relative position and the monitoring of the surrounding environment. The monitoring process of monitoring module 220 will be described in more detail below in conjunction with FIG. 6. When monitoring module 220 detects an abnormal behavior of user 102, monitoring module 220 may transmit the result of the abnormal behavior of user 102 to notification module 230. Additionally, monitoring module 220 may transmit the result of the abnormal behavior of user 102 to identity verification module 210 to re-verify the identity of user 102 and prevent other persons from personating user 102.

Notification module 230 in FIG. 2 can receive result information of identity verification module 210 and monitoring module 220. When notification module 230 receives the result of failed verification on the identity of user 102 output by identity verification module 210, notification module 230 may provide an indication that the identity of user 102 is incorrect. For example, notification module 230 may send a message that the identity of user 102 is incorrect to a server, a cloud server, or a remote administrator. When notification module 230 receives the result of an abnormal behavior of user 102 output by monitoring module 220, notification module 230 may provide an indication of the abnormal behavior of user 102. For example, notification module 230 may send a message indicating the abnormal behavior of user 102 to a server, a cloud server, or a remote administrator.

Additionally, in some embodiments, notification module 230 may be connected to a local server in a wired manner, or connected to a cloud server or a communication device of a remote administrator in a wireless manner, such as Bluetooth, WiFi, 5G, etc., so as to send notification messages to the server, the cloud server, or the remote administrator.

In this way, the identity of user 102 can be verified, and the behaviors of user 102 can be monitored. In addition, the message of failed verification on the identity of user 102 may be sent to the server or the remote administrator. In this way, the server can record the information that the identity of user 102 has been forged, and the remote administrator can intervene in the behavior of identity forging of user 102. In addition, a message about an abnormal behavior of user 102 can also be sent to the server or a remote administrator, so that the server can record the information about the abnormal behavior of user 102, and the remote administrator can intervene in the abnormal behavior of user 102.

For situations such as remote examinations, the above method can play a particularly important role. For example, it is possible to prevent user 102 taking a remote examination from looking for another person to take the examination on his behalf. In addition, some cheating behaviors of user 102 in the process of taking an examination can also be avoided.

Figure 3:
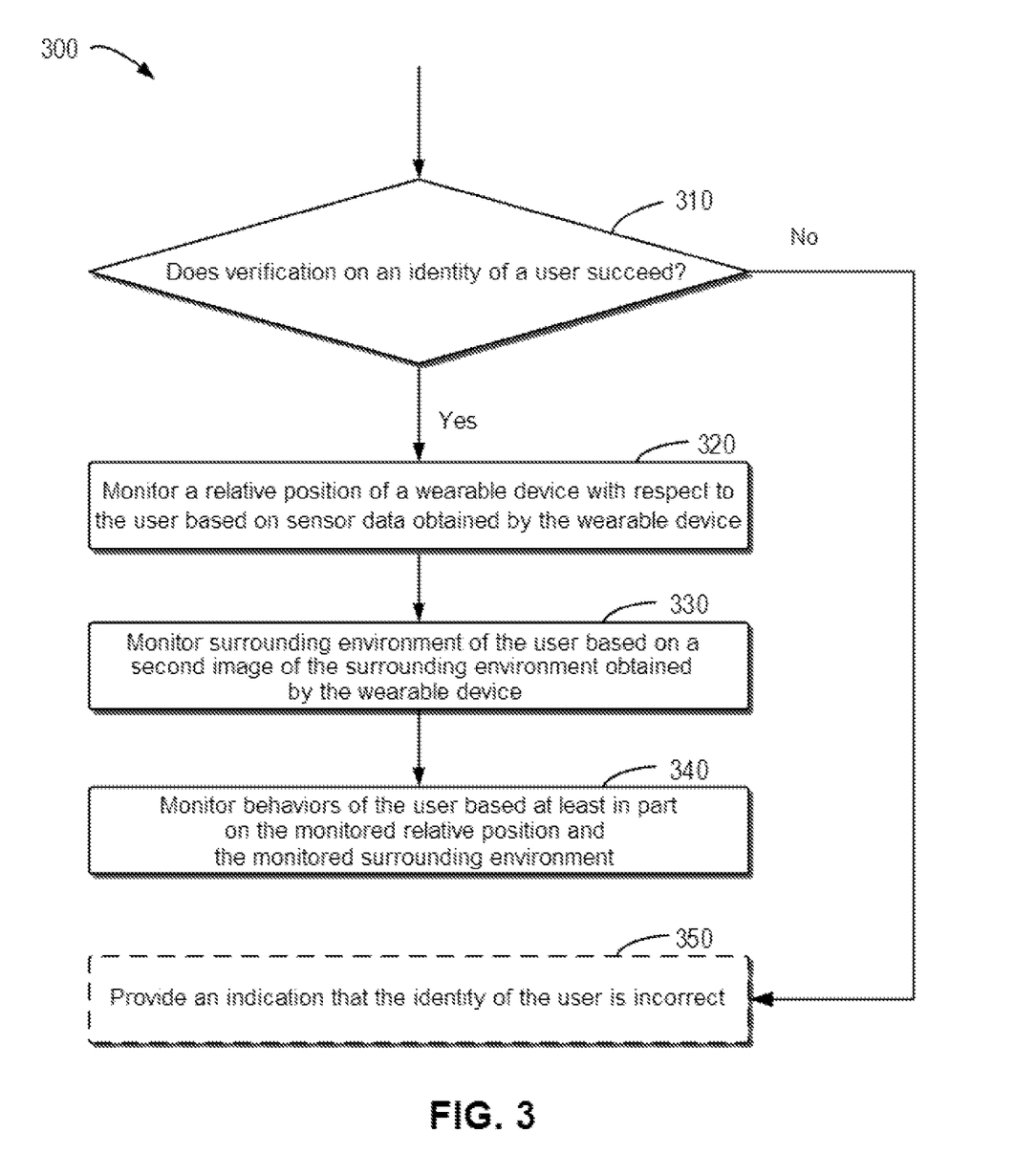
FIG. 3 shows a flow chart of an example method for monitoring a user according to some embodiments of the present disclosure.

FIG. 3 shows a flow chart of example method 300 for monitoring user 102 according to some embodiments of the present disclosure. Method 300 may be executed, e.g., by processing unit 140 of wearable device 101 shown in FIG. 1. The steps of method 300 may also be executed by the modules of processing unit 140 shown in FIG. 2. It should be understood that method 300 may also be executed by other suitable devices or apparatuses. Method 300 may include additional actions not shown and/or may omit actions shown, and the scope of the present disclosure is not limited in this regard. Method 300 is described in detail below with reference to FIG. 1.

As shown in FIG. 3, at 310, processing unit 140 determines whether verification on an identity of user 102 succeeds by analyzing user data related to user 102 and obtained by wearable device 101. The user data includes at least a first image of a part of the body of user 102. In some embodiments, first camera 110 arranged on wearable device 101 may be used to capture an image of an iris of user 102 as the first image. The iris image contains rich texture information, and the iris image of each user 102 is unique and unchanged. Therefore, using the iris image as the first image can improve the accuracy, stability, and reliability of identity verification.

In some other embodiments, first camera 110 arranged outside wearable device 101 and communicable with wearable device 101 may also be used to capture other body parts of user 102, such as an image of the face, as the first image.

In some embodiments, this process may be performed by identity verification module 210 of processing unit 140. The identity verification process for user 102 will be described in more detail below in conjunction with FIG. 5.

If it is determined at 310 that the verification on the identity of user 102 succeeds, method 300 proceeds to 320. At 320, processing unit 140 monitors a relative position of wearable device 101 with respect to user 102 based on sensor data obtained by wearable device 101. In some embodiments, set of pressure sensors 120 arranged on wearable device 101 may be used to collect the sensor data. Set of pressure sensors 120 may, for example, when wearable device 101 is worn by user 102, be distributed at the top side, left side, and right side of the head of user 102.

At 330, processing unit 140 monitors a surrounding environment of user 102 based on a second image of the surrounding environment of user 102 obtained by wearable device 101. In some embodiments, second camera 130 arranged on wearable device 101 may be used to capture the second image. In other embodiments, a second camera arranged outside wearable device 101 and separated from wearable device 101, for example, a second camera arranged on a ceiling, may be used to capture the second image of the surrounding environment of user 102 in 360 degrees.

At 340, processing unit 140 monitors behaviors of user 102 based at least in part on the monitored relative position and the monitored surrounding environment. For example, when the relative position monitored by processing unit 140 changes greatly, it may indicate that a behavior of user 102 is abnormal. For another example, when the surrounding environment changes greatly, for an example when the second image changes greatly, it may indicate that a behavior of user 102 is abnormal. In some embodiments, the processes at 320, 330, and 340 may be performed by monitoring module 220 of processing unit 140.

If it is determined at 310 that the verification on the identity of user 102 fails, method 300 proceeds to 350. At 350, processing unit 140 provides an indication that the identity of user 102 is incorrect. In some embodiments, notification module 230 of processing unit 140 may provide an indication that the identity of user 102 is incorrect. For example, the indication that the identity of user 102 is incorrect may be provided to a remote examination center or a remote administrator.

It should be understood that although the steps are shown in a specific order in FIG. 3, some or all of these steps may be performed in other orders or in parallel. For example, in FIG. 3, 310 may be performed by multiple steps, operations at 320 and 330 may be performed in parallel, or the operation at 330 may be performed before the operation at 320.

In a conventional solution, for example, for a user who takes a remote examination, remote monitoring personnel compares the user's facial image seen through a camera with a pre-stored user's photo to determine the identity of the user. The accuracy of this method is very low, and the user can find someone who looks similar to him to take the examination for him, without being discovered by the monitoring personnel. In particular, for twins who look very similar, the monitoring personnel will never detect that the identity of the user is incorrect. In other conventional solutions, a user is also required to answer a series of security questions to verify the identity of the user. This method is very cumbersome, and it is difficult to prevent the user from telling other people his personal information and letting other people take the examination for him.

By verifying the identity of user 102 in the above-described manner herein, the above-mentioned problems can be solved, thereby preventing other people from personating user 102. For example, the identity of user 102 is verified through the first image of the iris of user 102. Even for twins who look very similar, their iris information is different, so the identity of user 102 can be accurately verified. In addition, this method does not require user 102 to answer a series of security questions, which saves time, and user 102 will not be annoyed by the need to answer many questions.

In addition, the solution of the present disclosure can also monitor the behaviors of user 102 to avoid abnormal behaviors of user 102 that do not conform to regulations, such as cheating. Since this method does not require the staff to perform identity verification and behavior monitoring on user 102, labor can be saved. On the other hand, since there is no need for other staff to remotely monitor user 102, user 102 will not feel being monitored, thereby improving the comfort of user 102.

Figure 4:
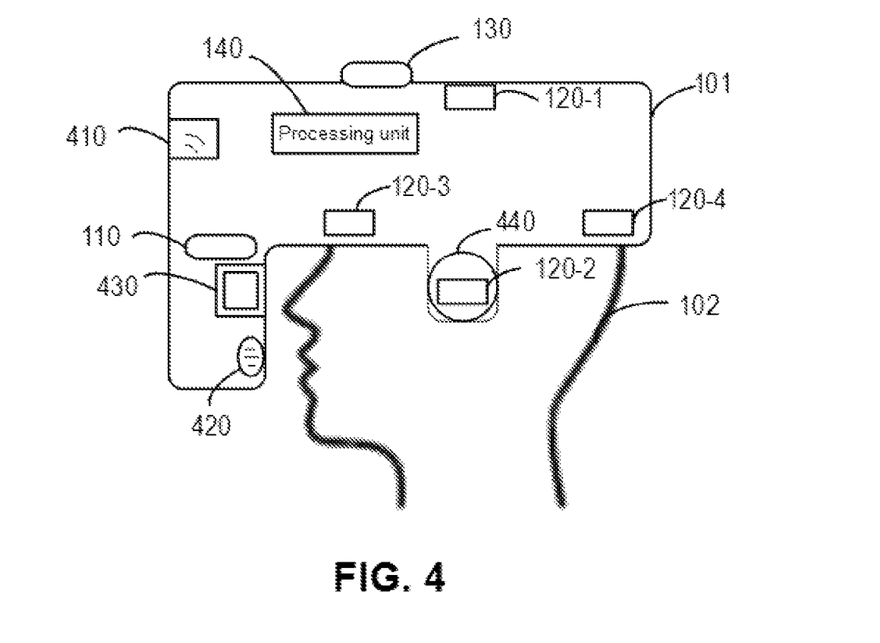
FIG. 4 shows a more detailed schematic diagram of an example wearable device according to some embodiments of the present disclosure.

FIG. 4 shows a more detailed schematic diagram of example wearable device 101 according to some embodiments of the present disclosure. As shown in FIG. 4, similar to FIG. 1, wearable device 101 may include processing unit 140, first camera 110, and second camera 130. Additionally or alternatively, in some embodiments, in addition to the elements or components described with reference to FIG. 1, wearable device 101 may further include additional elements or components. For example, wearable device 101 may include set of pressure sensors 120. When wearable device 101 is worn by user 102, set of pressure sensors 120 is distributed at the top side (for example, pressure sensor 120-1 shown in FIG. 4), the left side (for example, pressure sensor 120-2 shown in FIG. 4), the right side (not shown), the front side (for example, pressure sensor 120-3 shown in FIG. 4), and the rear side (for example, pressure sensor 120-4 shown in FIG. 4) of the head of user 102. By using set of pressure sensors 120 distributed at multiple different positions of the head of user 102, a more accurate relative position of wearable device 101 with respect to user 102 may be obtained.

Additionally, wearable device 101 may further include near field communication (NFC) sensor 410 configured to collect identity data of user 102, for example, identity data included in an ID card or other cards of user 102. In other embodiments, NFC sensor 410 may be arranged outside wearable device 101 and can communicate with wearable device 101. Processing unit 140 of wearable device 101 can receive the identity data collected by NFC sensor 410 to verify the identity of user 102.

In some embodiments, wearable device 101 may further include microphone 420 configured to collect sound data of user 102. In other embodiments, microphone 420 may be arranged outside wearable device 101 and can communicate with wearable device 101. Processing unit 140 of wearable device 101 can receive the user's sound data collected by microphone 420 to verify the identity of user 102. In addition, in the process of monitoring the behaviors of the user, processing unit 140 may analyze the user's sound data collected by microphone 420 to determine whether there is a person other than user 102.

In some embodiments, wearable device 101 may further include display 430 to provide display content to user 102. For example, for user 102 taking a remote examination, when user 102 wears wearable device 101, display 430 may be used to provide user 102 with a display of examination content. In some embodiments, wearable device 101 may be of a surrounding type. When user 102 wears wearable device 101, user 102 can only see the content displayed on display 430, but cannot see the external environment. In this way, user 102 can be prevented from cheating.

It is conceivable that, in a conventional solution, a user uses a laptop computer to take a remote examination, and an invigilator monitors the user through a built-in camera of the laptop computer. However, if the user places textbooks or other materials in locations that cannot be captured by the camera, the user can view the textbooks or other materials during the remote examination without being discovered by the remote invigilator. Here, by using display 430 on wearable device 101 to provide user 102 with a display of examination content, cheating in the above scenario can be avoided.

In some embodiments, wearable device 101 may further include headset 440 to provide user 102 with sound content. In some embodiments, headset 440 may be a head-mounted noise reduction headset. When user 102 wears wearable device 101, user 102 can only hear the sound content provided by headset 440, but cannot hear outside sounds. It is conceivable that in a location near the user taking a remote examination that will not be captured by the surveillance camera, other personnel can verbally tell the user the answer to the examination without being discovered by the remote invigilator. Here, by using headset 440 on wearable device 101, cheating in the above scenario can be avoided.

Figure 5:
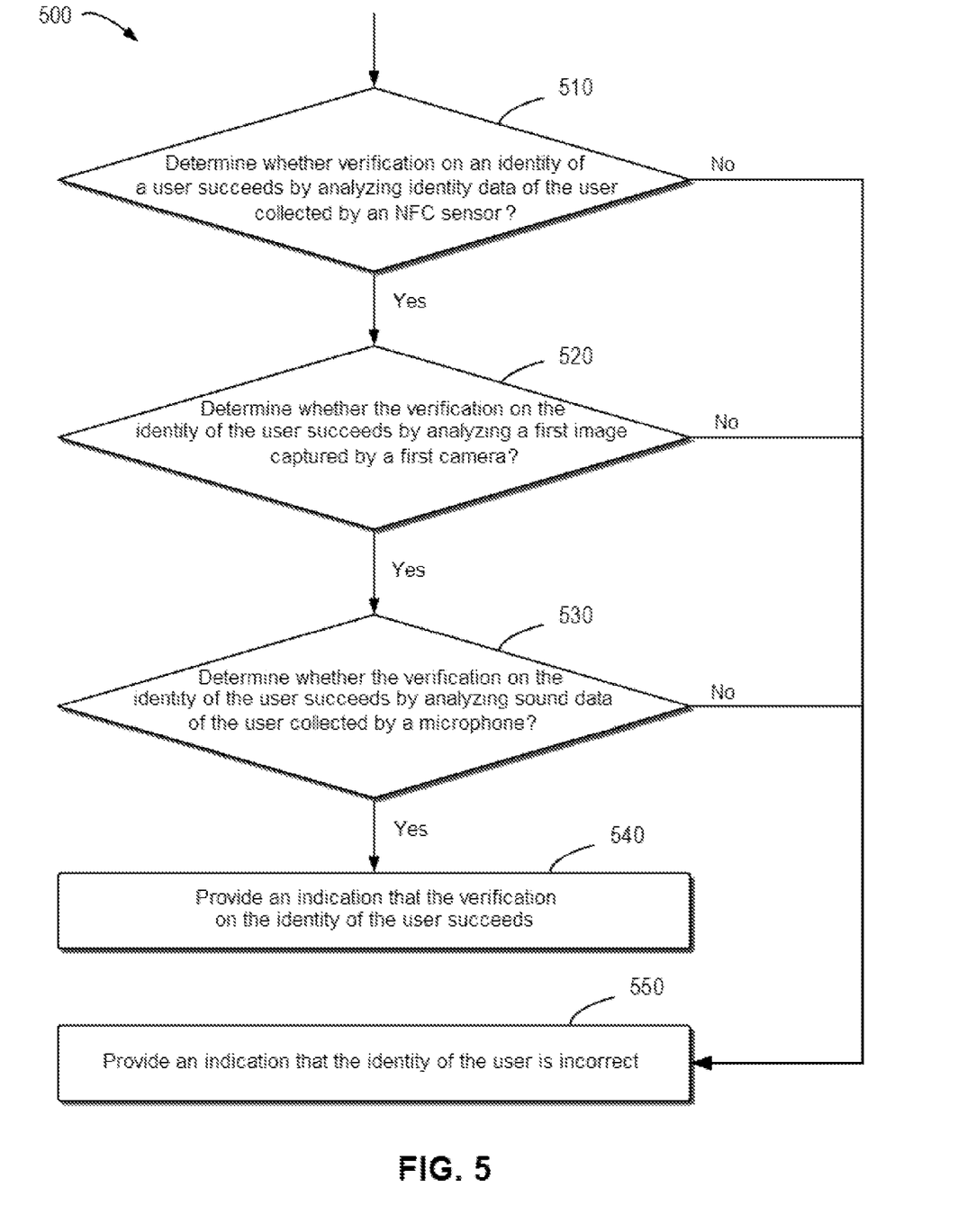
FIG. 5 shows a flow chart of an example method for verifying an identity of a user according to some embodiments of the present disclosure.

In some embodiments, method 500 shown in FIG. 5 may be used to verify the identity of user 102. Several embodiments for verifying the identity of user 102 will be described in more detail below in conjunction with FIG. 5.

FIG. 5 shows a flow chart of example method 500 for verifying an identity of user 102 according to some embodiments of the present disclosure. Method 500 may be regarded as an example implementation of 310 and 350 in method 300. Method 500 may be executed, for example, by processing unit 140 of wearable device 101 as shown in FIG. 1 and FIG. 4, and each step of method 500 may also be executed by the modules of processing unit 140 shown in FIG. 2. It should be understood that method 500 may also be executed by other suitable devices or apparatuses. Method 500 may include additional actions not shown and/or may omit actions shown, and the scope of the present disclosure is not limited in this regard. Method 500 is described in detail below with reference to FIG. 4.

As shown in FIG. 5, at 510, processing unit 140 determines whether the verification on the identity of user 102 succeeds by analyzing identity data of user 102 collected by NFC sensor 410. For example, NFC sensor 410 may be used to collect identity data included in the ID card of user 102. Processing unit 140 receives the identity data collected by NFC sensor 410 and compares it with predetermined identity information of user 102 to determine whether the verification on the identity of user 102 succeeds. If the degree of matching between the identity data and the predetermined identity information of user 102 exceeds a certain threshold, it means that the verification on the identity of user 102 succeeds; otherwise, it means that the verification on the identity of user 102 fails.

If it is determined at 510 that the verification on the identity of user 102 succeeds, method 500 proceeds to 520. At 520, processing unit 140 determines whether the verification on the identity of user 102 succeeds by analyzing a first image captured by first camera 110. For example, processing unit 140 may receive a first image of an iris of user 102 captured by first camera 110 arranged on wearable device 101, and compare the first image with predetermined iris information of user 102 to determine whether the verification on the identity of user 102 succeeds. For example, processing unit 140 may perform image analysis on the first image and extract iris data therefrom. If the degree of matching between the extracted iris data and the predetermined iris information of user 102 exceeds a certain threshold, it means that the verification on the identity of user 102 succeeds; otherwise, it means that the verification on the identity of user 102 fails.

If it is determined at 520 that the verification on the identity of user 102 succeeds, method 500 proceeds to 530. At 530, processing unit 140 analyzes sound data of user 102 collected by microphone 420 to determine whether the verification on the identity of user 102 succeeds. For example, processing unit 140 may receive the sound data of user 102 collected by microphone 420 arranged on wearable device 101, and compare the sound data with predetermined sound information of user 102 to verify whether the verification on the identity of user 102 succeeds. For example, processing unit 140 may perform voice analysis on the collected sound data and extract voice feature information therefrom. If the degree of matching between the extracted voice feature information and predetermined sound information of user 102 exceeds a certain threshold, it means that the verification on the identity of user 102 succeeds; otherwise, it means that the verification on the identity of user 102 fails.

If it is determined at 530 that the verification on the identity of user 102 succeeds, method 500 proceeds to 540. At 540, processing unit 140 provides an indication that the verification on the identity of user 102 succeeds. For example, processing unit 140 may provide the indication that the verification on the identity of user 102 succeeds to a local server, a cloud server, or remote monitoring personnel.

If it is determined at 510 that the verification on the identity of user 102 fails, method 500 proceeds to 550. At 550, processing unit 140 provides an indication that the identity of user 102 is incorrect. For example, processing unit 140 may provide the indication that the identity of user 102 is incorrect to a local server, a cloud server, or remote monitoring personnel.

If it is determined at 520 that the verification on the identity of user 102 fails, method 500 proceeds to 550. At 550, processing unit 140 provides the indication that the identity of user 102 is incorrect. For example, processing unit 140 may provide the indication that the identity of user 102 is incorrect to a local server, a cloud server, or remote monitoring personnel.

If it is determined at 530 that the verification on the identity of user 102 fails, method 500 proceeds to 550. At 550, processing unit 140 provides the indication that the identity of user 102 is incorrect. For example, processing unit 140 may provide the indication that the identity of user 102 is incorrect to a local server, a cloud server, or remote monitoring personnel.

It should be understood that although the steps are shown in a specific order in FIG. 5, some or all of these steps may be performed in other orders or in parallel. For example, in FIG. 5, the operation of 520 may be performed before the operation of 510, or the operation of 530 may be performed before the operation of 520. In some embodiments, the processes at 510, 520, and 530 may be executed by identity verification module 210 of processing unit 140, and the processes at 540 and 550 may be executed by notification module 230 of processing unit 140. In other embodiments, other apparatuses or devices may also be used to perform the steps of method 500.

Through the above method, the identity of user 102 may be verified in multiple ways, thereby improving the accuracy of the verification. In addition, an indication that the identity of user 102 is incorrect may be provided to a server or remote monitoring personnel to intervene in user 102 for whom the identity verification fails.

Figure 6:
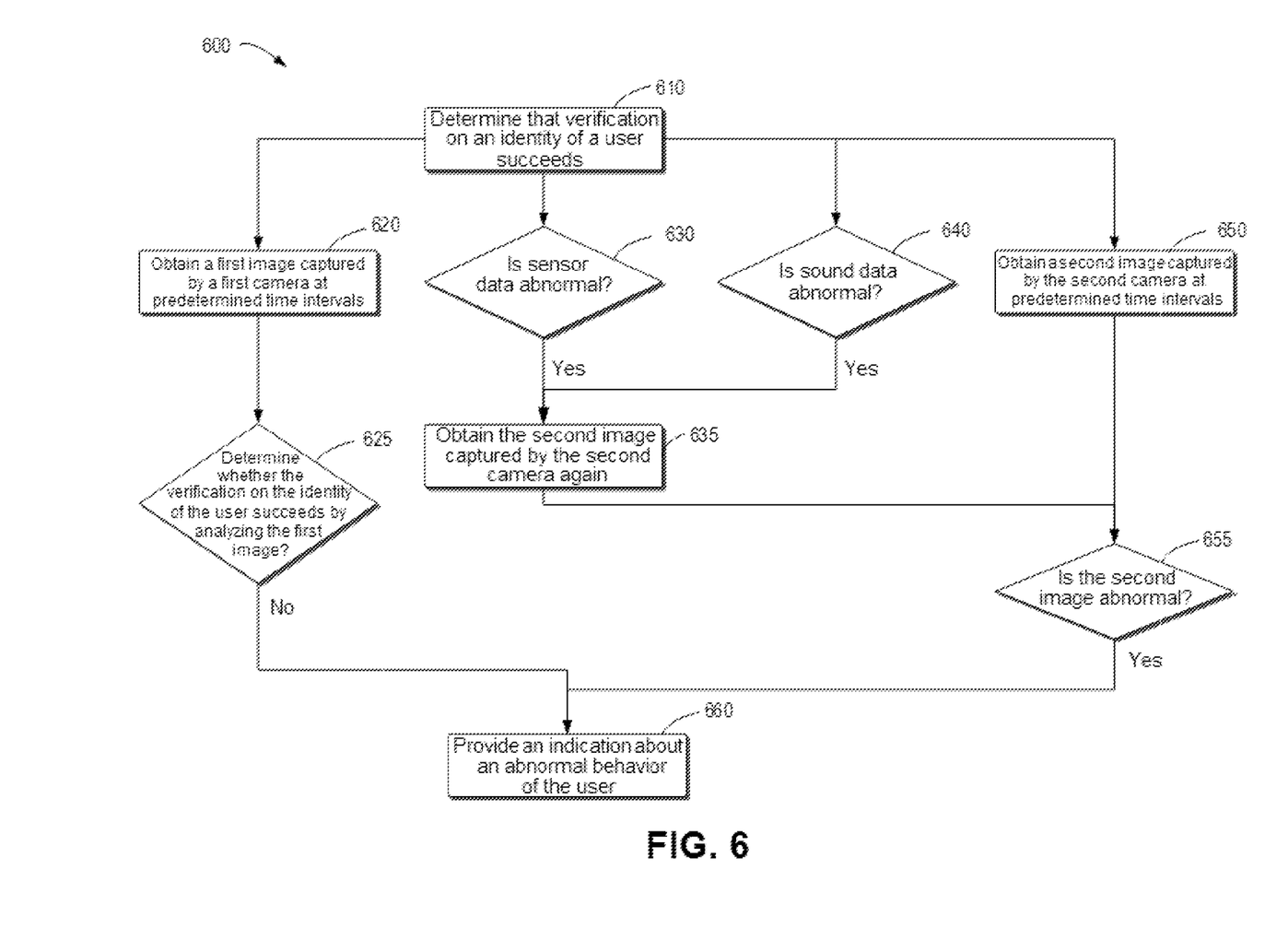
FIG. 6 shows a flow chart of an example method for monitoring behaviors of a user according to some embodiments of the present disclosure.

In some embodiments, if the verification on the identity of user 102 succeeds, the behaviors of user 102 may be further monitored. FIG. 6 shows a flow chart of example method 600 for monitoring behaviors of user 102 according to some embodiments of the present disclosure. Method 600 may be regarded as an example implementation of 320, 330, and 340 in method 300. Method 600 may be executed, for example, by processing unit 140 of wearable device 101 as shown in FIG. 1 and FIG. 4, and the steps in method 600 may be executed by the modules, as shown in FIG. 2, of processing unit 140. It should be understood that method 600 may also be executed by other suitable devices or apparatuses. Method 600 may include additional actions not shown and/or may omit actions shown, and the scope of the present disclosure is not limited in this regard. Method 600 is described in detail below with reference to FIG. 4.

At 610, processing unit 140 determines that the verification on the identity of user 102 succeeds. For example, method 500 described with reference to FIG. 5 may be used to determine that the verification on the identity of user 102 succeeds.

At 620, processing unit 140 acquires a first image captured by first camera 110 at predetermined time intervals. At 625, processing unit 140 analyzes the first image to determine whether the verification on the identity of user 102 succeeds. For example, first camera 110 captures a part of the body of user 102, such as a first image of an iris, at predetermined time intervals. Processing unit 140 receives the first image captured by first camera 110 at predetermined time intervals, performs image analysis on the first image, and extracts visual feature information from the first image. Processing unit 140 compares the extracted visual feature information with predetermined image feature information of user 102, such as iris information, to verify whether the verification on the identity of user 102 succeeds. In addition, the first image may also monitor movement of the eyes of user 102. If user 102 frequently moves the eyes to a position far away from the examination content, it can be judged as a suspicious behavior.

In this way, not only is the identity of user 102 verified before user 102 starts to conduct a behavior, such as taking a remote examination, but also the identity of user 102 is continuously verified during the behavior of user 102 to further avoid the act of identity personation.

At 625, if it is determined that the verification on the identity of user 102 fails, method 600 proceeds to 660. At 660, processing unit 140 provides an indication about an abnormal behavior of user 102. For example, processing unit 140 may provide the indication about an abnormal behavior of user 102 to a local server, a cloud server, or remote monitoring personnel.

Returning to FIG. 6, after it is determined at 610 that the verification on the identity of user 102 succeeds, at 630, processing unit 140 determines whether sensor data is abnormal. For example, after user 102 wears wearable device 101, the relative position of wearable device 101 with respect to user 102 will remain basically unchanged. Therefore, the sensor data collected by set of pressure sensors 120 will remain basically unchanged. If the data collected by one of the pressure sensors, such as top pressure sensor 120-1, suddenly changes, but the data of the other pressure sensors does not change, processing unit 140 will determine that the sensor data is abnormal. For another example, when a difference between the data collected by left pressure sensor 120-2 and by the right pressure sensor exceeds a threshold, or a difference between the data collected by front pressure sensor 120-3 and by rear pressure sensor 120-4 exceeds a threshold, processing unit 140 will determine that the sensor data is abnormal. It should be understood that there are other abnormalities in sensor data. For example, sensor data changes exceed a certain threshold. Various abnormalities in sensor data can indicate that the relative position of wearable device 101 with respect to user 102 has changed.

Through the above method, it can be monitored when, for example, user 102 gently moves up wearable device 101 from a position where the eyes and ears are covered after wearable device 101 is worn to a position where the eyes and ears are exposed. For example, user 102 taking a remote examination may gently move up wearable device 101 during the examination to expose his/her eyes to view information from the outside world, or expose his/her ears to listen to other personnel telling him/her answers. The present disclosure can monitor the above situations through the above methods, thereby avoiding cheating.

Through the above method, it can also be monitored when, for example, user 102 slowly lifts one side of wearable device 101, for example, lifts the left side to expose the left ear. Therefore, the solution of the present disclosure can also avoid this type of behavior of user 102.

Returning to FIG. 6, at 630, if the sensor data is abnormal, method 600 proceeds to 635. At 635, processing unit 140 obtains again the second image captured by the second camera 130. Next, method 600 proceeds to 655. At 655, whether the second image is abnormal is determined.

Returning to FIG. 6, after it is determined at 610 that the verification on the identity of user 102 succeeds, at 640, processing unit 140 determines whether the sound data is abnormal. For example, processing unit 140 receives the sound data collected by microphone 420, compares it with the predetermined sound information of user 102, determines whether the sound data matches the sound of user 102, and determines whether there is the sound of a person other than user 102. If the sound data does not match the predetermined sound information of user 102, or there is sound data of a person other than user 102, the sound data is abnormal. Various appropriate voice recognition techniques can be used to analyze the collected sound data. For example, a voiceprint of user 102 is extracted from the sound data and compared with predetermined voiceprint information, and the identity of user 102 is determined according to their similarity.

In this way, it is possible to prevent the behavior of a person other than user 102 from interfering with user 102. For example, for user 102 taking a remote examination, it is possible to prevent a person other than user 102 from telling user 102 the answer verbally to assist user 102 in cheating.

At 640, if it is determined that the sound data is abnormal, method 600 proceeds to 635. At 635, processing unit 140 obtains again the second image captured by second camera 130. Next, method 600 proceeds to 655. At 655, whether the second image is abnormal is determined.

Returning to FIG. 6, after it is determined at 610 that the verification on the identity of user 102 succeeds, at 650, processing unit 140 obtains the second image captured by second camera 130 at predetermined time intervals. At 655, processing unit 140 determines whether the second image is abnormal. For example, processing unit 140 may compare the second image with a second image obtained at a previous time, and use various appropriate image analysis methods to perform feature extraction on the current second image and the previous second image. If the difference between the visual feature information extracted from the current second image and the previous second image exceeds a threshold, it indicates that the second image is abnormal.

In this way, it is possible to prevent other people from appearing around user 102 or to prevent other items that are not allowed from appearing. For example, in some scenarios, there may be other people behind user 102 taking a remote examination to help user 102 cheat by touching his or her back. Through the analysis of the second image, other people in the surrounding environment of user 102 can be detected, thereby avoiding cheating.

At 655, if it is determined that the second image is abnormal, the method proceeds to 660. At 660, processing unit 140 provides an indication about an abnormal behavior of user 102. For example, processing unit 140 may provide the indication about an abnormal behavior of user 102 to a local server, a cloud server, or remote monitoring personnel.

In this way, for example, when user 102 is taking a remote examination, his or her abnormal behaviors during the examination (such as taking the examination by others, sound prompts by others, viewing other reference materials, etc.) may be provided to a local server, a cloud server, or remote monitoring personnel. In this way, the server can record the cheating behavior of user 102, and the remote monitoring personnel can intervene in the behavior or interrupt the examination of user 102.

It should be understood that, in other embodiments, after determining that the sensor data is abnormal at 630, method 600 may directly proceed to 660. After determining that the sound data is abnormal at 640, method 600 may also proceed directly to 660.

In the embodiment shown in FIG. 6, after determining that the sensor data is abnormal at 630 or after determining that the sound data is abnormal at 640, the method does not directly proceed to 660, but to 635. This is to re-determine the abnormal behavior of user 102 based on the monitoring of the surrounding environment of user 102 to avoid misjudgment. For example, user 102 may just briefly take off and adjust wearable device 101 due to discomfort in wearing. By monitoring the surrounding environment of user 102 based on the second image, this situation can be prevented from being misjudged as an abnormal behavior of user 102.

In a conventional monitoring solution, for example, in a conventional monitoring solution of remote examinations, a secure browser is used to prevent a user from searching for information. The remote monitoring personnel can ask the user to show the surrounding environment before the examination to prevent the user from placing relevant information aside for viewing. The remote monitoring personnel can also record the user's examination process to see if the user's eyes move suspiciously, to prevent the user from cheating. In the conventional solution, the user's body temperature and pulse can also be monitored by using devices such as smart watches, so as to monitor the behaviors of the user through suspicious pulse fluctuations.

None of these conventional methods can effectively prevent the user from cheating. For example, the user can place the material in a location invisible from the surface when the remote monitoring personnel asks him or her to display the surrounding environment, and after starting the examination, the user can take out the material and place it in a location that the monitoring personnel cannot see through a camera to cheat. In addition, some users can effectively disguise their sight and control their pulses when cheating, so they will not be suspected of cheating. Moreover, this conventional solution increases the workload of the monitoring personnel, and the monitoring personnel is required to view the user's examination video to prevent the user from cheating.

In illustrative embodiments disclosed herein, the behaviors of user 102 can be monitored by monitoring the relative position of wearable device 101 with respect to user 102 and the surrounding environment of user 102 to solve the above problems. For example, the method herein can monitor suspicious people, sound, or objects next to user 102, and can also monitor the suspicious behavior of user 102 taking off wearable device 101.

In addition, this monitoring method does not require remote monitoring personnel to monitor user 102, which reduces the workload of the monitoring personnel and saves costs. In addition, since there is no remote monitoring personnel to monitor user 102 in real time, user 102 will not have the feeling of being monitored, and will not feel uncomfortable.

The method herein uses a variety of different information and data, such as the iris image of user 102, the sound data of user 102, the surrounding environment information of user 102, etc., to monitor the behaviors of user 102, making the monitoring more complete and accurate. Especially for certain cheating behaviors using high-tech means, for example, using virtual scenes to falsify the surrounding environment, or using certain devices to keep the sensor data of set of sensors 120 unchanged. Since the method herein adopts a variety of different methods to monitor user 120 in various aspects, the above-mentioned cheating behaviors that are more difficult to be monitored can be avoided.

The methods and devices described herein not only can be used in remote applications such as remote examinations, but also can be used in other aspects. For example, they can be used in e-sports competitions to prevent participants from cheating. For another example, they can be used to monitor working conditions of remote office workers.

It should be pointed out that some of the features described in this specification have been presented as modules to more particularly emphasize the independence of their implementations. For example, the modules can be implemented as a hardware circuit, such as an integrated circuit or a gate array. The modules can also be implemented in programmable hardware devices (such as field programmable gate arrays, programmable array logic, programmable logic devices, graphics processing units, etc.). The modules can also be implemented at least partially in software for execution by various types of processors. The modules can also be implemented by any other appropriate hardware, software, or a combination of hardware and software.

Figure 7:
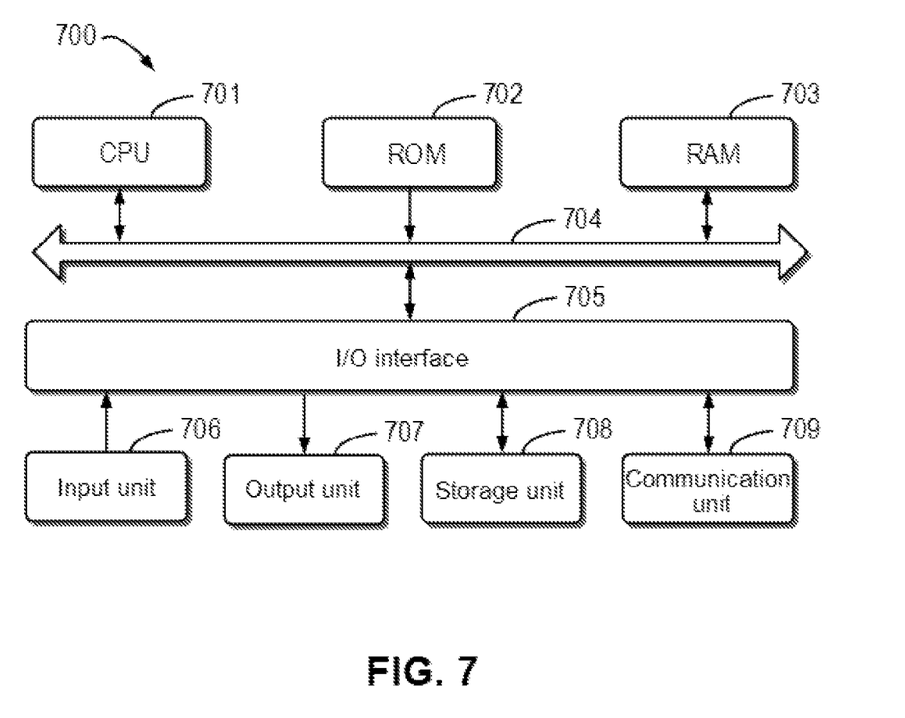
FIG. 7 shows a schematic block diagram of an example device that can be used to implement an embodiment of the present disclosure.

Methods 300, 500, and 600 for monitoring user behaviors according to the embodiments of the present disclosure are described above with respect to processing unit 140 of wearable device 101. Methods 300, 500, and 600 can also be executed by other devices that are physically independent of wearable device 101. Such devices can communicate with wearable device 101 to receive data collected by one or more components of wearable device 101. FIG. 7 shows a schematic block diagram of example device 700 that can be configured to implement an embodiment of the present disclosure. For example, the actions described above with respect to processing unit 140 may be performed by device 700. As shown in FIG. 7, device 700 includes a processing unit, illustratively a central processing unit (CPU) 701, that may perform various appropriate actions and processing according to computer program instructions stored in read-only memory (ROM) 702 or computer program instructions loaded from storage unit 708 to random access memory (RAM) 703. In RAM 703, various programs and data required for the operation of device 700 may also be stored. CPU 701, ROM 702, and RAM 703 are connected to each other through bus 704. Input/output (I/O) interface 705 is also connected to bus 704.

Multiple components in device 700 are connected to I/O interface 705, including: input unit 706, such as a keyboard and a mouse; output unit 707, such as various types of displays and speakers; storage unit 708, such as a magnetic disk and an optical disk; and communication unit 709, such as a network card, a modem, and a wireless communication transceiver. Communication unit 709 allows device 700 to exchange information/data with other devices via a computer network such as the Internet and/or various telecommunication networks.

The various processes and processing described above, such as method 300, 500, and/or 600, may be performed by CPU 701. For example, in some embodiments, methods 300, 500, and/or 600 may be embodied as a computer software program that is tangibly included in a machine-readable medium, such as storage unit 708. In some embodiments, part or all of the computer program may be loaded and/or installed on device 700 via ROM 702 and/or communication unit 709. When the computer program is loaded into RAM 703 and executed by CPU 701, one or more actions of methods 300, 500, and/or 600 described above may be implemented.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that can hold and store instructions used by an instruction execution device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disk read-only memory (CD-ROM), a digital versatile disk (DVD), a memory stick, a floppy disk, a mechanical encoding device such as a punch card or a raised structure in a groove having instructions stored thereon, and any suitable combination thereof. Computer-readable storage media used herein are not to be interpreted as transient signals per se, such as radio waves or other freely propagating electromagnetic waves, electromagnetic waves propagating through waveguides or other transmission media (for example, light pulses through fiber optic cables), or electrical signals transmitted via electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium in each computing/processing device.

Computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, wherein the programming languages include object-oriented programming languages such as Smalltalk and C++, and conventional procedural programming languages such as the C language or similar programming languages. The computer-readable program instructions may be executed entirely on a user's computer, partly on a user's computer, as a stand-alone software package, partly on a user's computer and partly on a remote computer, or entirely on a remote computer or a server. In the case where a remote computer is involved, the remote computer can be connected to a user computer over any kind of networks, including a local area network (LAN) or a wide area network (WAN), or can be connected to an external computer (e.g., connected over the Internet using an Internet service provider). In some embodiments, an electronic circuit, for example, a programmable logic circuit, a field programmable gate array (FPGA), or a programmable logic array (PLA), is personalized by utilizing state information of the computer-readable program instructions, wherein the electronic circuit may execute computer-readable program instructions so as to implement various aspects of the present disclosure.

Various aspects of the present disclosure are described herein with reference to flow charts and/or block diagrams of the method, the apparatus (system), and the computer program product according to the embodiments of the present disclosure. It should be understood that each block in the flow charts and/or block diagrams as well as a combination of blocks in the flow charts and/or block diagrams may be implemented using computer-readable program instructions.

The computer-readable program instructions may be provided to a processing unit of a general purpose computer, a special purpose computer, or other programmable data processing apparatuses to produce a machine, such that the instructions, when executed by the processing unit of the computer or other programmable data processing apparatuses, generate an apparatus for implementing the functions/actions specified in one or more blocks in the flow charts and/or block diagrams. These computer-readable program instructions may also be stored in a computer-readable storage medium, and these instructions cause a computer, a programmable data processing apparatus, and/or other devices to work in a specific manner; and thus the computer-readable medium having stored instructions includes an article of manufacture including instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, or they may be executed in an opposite order sometimes, depending on the functions involved. It should be further noted that each block in the block diagrams and/or flow charts as well as a combination of blocks in the block diagrams and/or flow charts may be implemented by using a special hardware-based system for executing specified functions or actions or by a combination of special hardware and computer instructions.

Various embodiments of the present disclosure have been described above. The foregoing description is illustrative rather than exhaustive, and is not limited to the disclosed embodiments. Numerous modifications and alterations are apparent to those of ordinary skill in the art without departing from the scope and spirit of the illustrated embodiments. The selection of terms used herein is intended to best explain the principles and practical applications of the embodiments or the improvements to technologies on the market, and to otherwise enable persons of ordinary skill in the art to understand the embodiments disclosed herein.

What is claimed is:

1. A wearable device, comprising:
   a processing unit, wherein the processing unit is configured to:
   verify an identity of a user by analyzing user data related to the user and obtained by the wearable device, the user data comprising at least a first image of a part of the user's body;
   if the verification on the identity of the user succeeds,
   monitor a relative position of the wearable device with respect to the user based on sensor data obtained by the wearable device;
   monitor a surrounding environment external to the user based on a second image of the surrounding environment obtained by the wearable device when mounted on the user; and
   monitor behaviors of the user based at least in part on the monitored relative position and the monitored surrounding environment;
   wherein monitoring behaviors of the user based at least in part on the monitored relative position and the monitored surrounding environment comprises generating an indication of an abnormal behavior of the user responsive to detection of more than a threshold amount of variation in at least one of the relative position and the surrounding environment.

2. The wearable device according to claim 1, further comprising at least one of the following:
   a first camera configured to capture the first image;
   a second camera different from the first camera and configured to capture the second image; and
   a set of sensors configured to collect the sensor data.

3. The wearable device according to claim 2, wherein the set of sensors comprises a set of pressure sensors, and when the wearable device is worn by the user, the set of pressure sensors is distributed at the top side, left side, and right side of the head of the user.

4. The wearable device according to claim 1, wherein the first image comprises an image of an iris of the user, and wherein the processing unit is configured to:
   verify the identity of the user by comparing the image of the iris with predetermined iris information.

5. The wearable device according to claim 1, wherein the processing unit is configured to:
   if it is determined that a change in the relative position exceeds a first threshold, determine whether the second image has changed; and
   if it is determined that the second image has changed, provide the indication about the abnormal behavior of the user.

6. The wearable device according to claim 1, wherein the processing unit is configured to:
   if it is determined that there is a person other than the user in the surrounding environment, provide the indication about the abnormal behavior of the user.

7. The wearable device according to claim 1, wherein the processing unit is further configured to:
   if the verification on the identity of the user succeeds, determine whether there is a person other than the user in the surrounding environment by comparing sound data of the user collected by a microphone of the wearable device with predetermined sound features; and
   if it is determined that there is the person, provide the indication about the abnormal behavior of the user.

8. The wearable device according to claim 1, wherein the processing unit is configured to: if the verification on the identity of the user succeeds, obtain and analyze the first image at predetermined time intervals to verify the identity of the user.

9. An electronic device, comprising:
   at least one processor; and
   at least one memory storing computer program instructions, wherein the at least one memory and the computer program instructions are configured to cause, together with the at least one processor, the electronic device to perform actions comprising:
   verifying an identity of a user by analyzing user data related to the user and obtained by a wearable device, the user data comprising at least a first image of a part of the user's body;
   if the verification on the identity of the user succeeds,
   monitoring a relative position of the wearable device with respect to the user based on sensor data obtained by the wearable device;
   monitoring a surrounding environment external to the user based on a second image of the surrounding environment obtained by the wearable device when mounted on the user; and
   monitoring behaviors of the user based at least in part on the monitored relative position and the monitored surrounding environment;

wherein monitoring behaviors of the user based at least in part on the monitored relative position and the monitored surrounding environment comprises generating an indication of an abnormal behavior of the user responsive to detection of more than a threshold amount of variation in at least one of the relative position and the surrounding environment.

10. A method for monitoring a user, comprising:
verifying an identity of the user by analyzing user data related to the user and obtained by a wearable device, the user data comprising at least a first image of a part of the user's body;
if the verification on the identity of the user succeeds,
monitoring a relative position of the wearable device with respect to the user based on sensor data obtained by the wearable device;
monitoring a surrounding environment external to the user based on a second image of the surrounding environment obtained by the wearable device when mounted on the user; and
monitoring behaviors of the user based at least in part on the monitored relative position and the monitored surrounding environment;
wherein monitoring behaviors of the user based at least in part on the monitored relative position and the monitored surrounding environment comprises generating an indication of an abnormal behavior of the user responsive to detection of more than a threshold amount of variation in at least one of the relative position and the surrounding environment.

11. The method according to claim 10, wherein
the first image is captured by a first camera of the wearable device;
the second image is captured by a second camera of the wearable device, the second camera being different from the first camera; and
the sensor data is collected by a set of sensors of the wearable device.

12. The method according to claim 11, wherein the set of sensors comprises a set of pressure sensors, and when the wearable device is worn by the user, the set of pressure sensors is distributed at the top side, left side, and right side of the head of the user.

13. The method according to claim 10, wherein the first image comprises an image of an iris of the user, and wherein verifying the identity of the user by analyzing the first image comprises:
verifying the identity of the user by comparing the image of the iris with predetermined iris information.

14. The method according to claim 10, wherein monitoring the behaviors of the user comprises:
if it is determined that a change in the relative position exceeds a first threshold, determining whether the second image has changed; and
if it is determined that the second image has changed, providing the indication about the abnormal behavior of the user.

15. The method according to claim 10, wherein monitoring the behaviors of the user comprises:
if it is determined that there is a person other than the user in the surrounding environment, providing the indication about an abnormal behavior of the user.

16. The method according to claim 10, further comprising:
if the verification on the identity of the user fails, providing an indication that the identity of the user is incorrect.

17. The method according to claim 10, wherein the user data further comprises at least one of the following:
identity data of the user collected by a near field communication (NFC) sensor of the wearable device, and
sound data collected by a microphone of the wearable device.

18. The method according to claim 10, further comprising:
if the verification on the identity of the user succeeds, determining whether there is a person other than the user in the surrounding environment by comparing sound data collected by a microphone of the wearable device with predetermined sound features; and
if it is determined that there is the person, providing the indication about the abnormal behavior of the user.

19. The method according to claim 10, further comprising:
if the verification on the identity of the user succeeds, obtaining and analyzing the first image at predetermined time intervals to verify the identity of the user.

20. A computer program product tangibly stored in a non-volatile computer-readable medium and comprising machine-executable instructions that, when executed by a device, cause the device to execute the method according to claim 10.

* * * * *